Sept. 27, 1960     A. E. BRICKMAN     2,954,248
MEANS FOR FASTENING A BRAKE CABLE ASSEMBLY TO BRACKET
Filed April 11, 1956
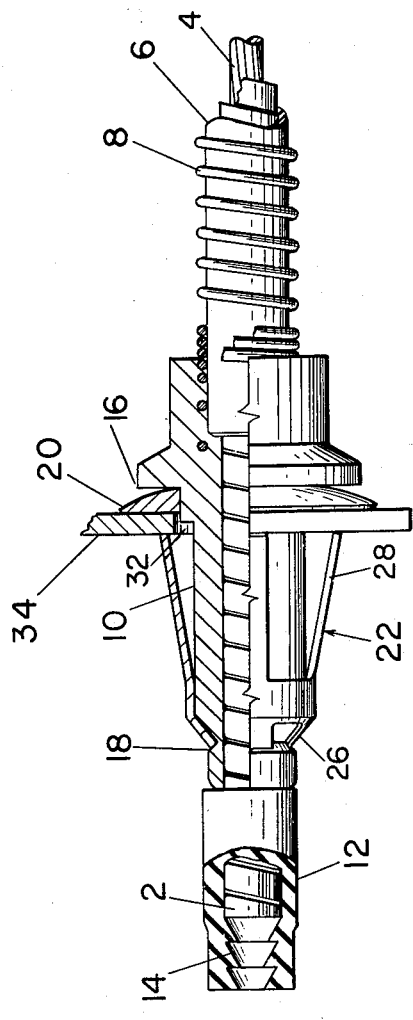
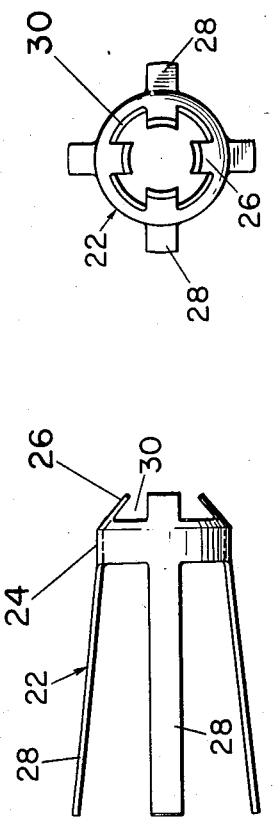
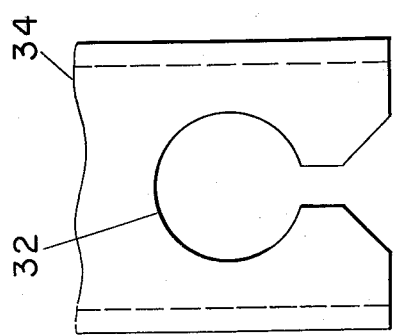
Inventor:
ALAN E. BRICKMAN
by Donald G. Dalton
his attorney United States Patent Office 2,954,248
Patented Sept. 27, 1960

2,954,248

MEANS FOR FASTENING A BRAKE CABLE ASSEMBLY TO BRACKET

Alan E. Brickman, Wethersfield, Conn., assignor to United States Steel Corporation, a corporation of New Jersey Filed Apr. 11, 1956, Ser. No. 577,575

4 Claims. (Cl. 287—20)

This invention relates to a brake cable assembly and more particularly to means for fastening the assembly to a bracket on the vehicle utilizing the brake cable. Brake cable assemblies of this general type are shown in my prior Patent No. 2,691,900, dated October 19, 1954, and my copending application Serial No. 410,691, filed February 16, 1954. Various constructions have been proposed for fastening the brake cable assembly to the vehicle but none have proved entirely satisfactory either from the standpoint of cost or ease of assembly and disassembly.

It is therefore an object of my invention to provide a brake cable assembly having means for readily attaching it to and detaching it from the vehicle.

This and other objects will be more apparent after referring to the following specification and attached drawings, in which:

Figure 1 is a view, partly in section, of one terminal of the conduit which receives the brake cable;

Figure 2 is a view of a bracket on the vehicle to which the cable assembly is attached;

Figure 3 is a view of part of the fastening means of my invention; and

Figure 4 is an end view of Figure 3.

Referring more particularly to the drawings, the reference numeral 2 indicates a flexible conduit through which a brake cable 4 passes. A jacket 6 of rubber, neoprene, nylon or other flexible material is extruded or strip insulated on the member 2. The rubber covering 6 is then stripped from an end of the conduit and a helically wound coil spring 8 is placed over portion of the rubber covering 6 and also over part of the bared portion of the conduit. A terminal fitting 10 is then die cast over the bared portion of the conduit 2 and over that part of the spring 8 which extends around the bared portion. A flexible seal 12 is then passed over the extreme end of the bared portion of conduit 2. The seal 12 may be provided with serrations 14 as in my above mentioned copending application, the serrations gripping the cable 4 which is omitted at this position for the purpose of clarity. The construction so far described is essentially the same as that shown in my above mentioned patent and copending application except for the construction of the fitting 10 which has an enlarged portion forming a circumferential shoulder 16 and a circumferential groove 18 spaced from the shoulder 16. A Belville washer 20 is passed over the fitting 10 and bears against shoulder 16. The fastening means includes a finger spring 22 having an annular intermediate portion 24, a plurality of stub fingers 26 extending from one end of the intermediate portion and a plurality of long fingers 28 extending from the opposite end of the portion 24. The stub fingers 26 are formed by making cutouts 30 on a frusto-conical end of the finger spring so that the fingers 26 extend inwardly toward the axis of the finger spring away from the intermediate portion 24. The fingers 28 in their normal position extend outwardly from the axis of the spring away from the portion 24.

In assembly, the washer 20 is positioned against the shoulder 16 and the finger spring 22 is positioned around the fitting 10 with the stub fingers 26 in the groove 18 and the long fingers 28 extending toward the washer 20. The assembly is passed through a slotted hole 32 in vehicle bracket 34. In passing through the hole 32 the fingers 28 are compressed radially inward but after passing through the hole the fingers expand to their normal position. The distance between the fingers 28 and washer 20 is such that the bracket 34 will be gripped therebetween, thus holding the assembly in position. The normal outside diameter of the ends of the fingers 28 is greater than the diameter of the hole 32 but the hole 32 is of sufficient diameter to pass the portion 24 and the fingers 28 when bent inwardly. The spring 22 is turned so that the slot in the opening 32 will not be in alignment with any of the fingers 28.

While one embodiment of my invention has been shown and described it will be apparent that other adaptations and modifications may be made without departing from the scope of the following claims.

I claim:

1. A brake cable assembly adapted to be fastened to a bracket of a vehicle comprising a flexible conduit through which the cable passes, a fitting integrally secured to one end of said conduit, a circumferential shoulder on said fitting, said fitting having a circumferential groove spaced from said shoulder, said groove and shoulder adapted to be located on opposite sides of a hole in said bracket, and a finger spring adapted to have one end received in said groove, said bracket being gripped between the other end of said spring and said shoulder, said finger spring having a closed annular intermediate portion, a plurality of stub fingers extending from the intermediate portion inwardly toward the first named end of the spring away from said intermediate portion and a plurality of long fingers extending from the intermediate portion outwardly to the last named end of the spring, said long fingers having a length substantially greater than the axial length of said annular intermediate portion.

2. A brake cable assembly adapted to be fastened to a bracket of a vehicle comprising a flexible conduit through which the cable passes, a fitting integrally secured to one end of said conduit, a circumferential shoulder on said fitting, said fitting having a circumferential groove spaced from said shoulder, said groove and shoulder adapted to be located on opposite sides of a hole in said bracket, a washer adapted to bear against said shoulder and one side of said bracket, and a finger spring adapted to have one end received in said groove and the other end bearing against the second side of said bracket, said finger spring having a closed annular intermediate portion, a plurality of stub fingers extending from the intermediate portion inwardly to the first named end of the spring away from said intermediate portion and a plurality of long fingers extending from the intermediate portion outwardly to the last named end of the spring, said long fingers having a length substantially greater than the axial length of said annular intermediate portion.

3. A brake cable assembly adapted to pass through a hole in a bracket on a vehicle comprising a flexible conduit through which the cable passes, a fitting integrally secured to one end of said conduit, a circumferential shoulder on said fitting, said fitting having a generally cylindrical portion of less diameter than said shoulder and said hole extending from said shoulder through said hole and a reduced diameter portion at the end of said cylindrical portion opposite said shoulder, and a finger spring having an annular intermediate portion, a plurality of stub fingers at one end of said annular intermediate portion extending generally radially inwardly away from said intermediate portion and a plurality of long fingers extending outwardly from the other end of said annular intermediate portion, said long fingers having a length substantially greater than the axial length of said annular intermediate portion, said bracket being gripped between the ends of said long fingers and said shoulder with the said annular intermediate portion closely fitting said cylindrical portion, and the said stub fingers extending into said reduced diameter portion.

4. A brake cable assembly adapted to pass through a hole in a bracket on a vehicle which comprises a flexible conduit through which the cable passes, a fitting secured to one end of said conduit, a circumferential shoulder on said fitting, said fitting having a generally cylindrical portion of less diameter than said shoulder and said hole extending from said shoulder through said hole and a reduced diameter portion at the end of said cylindrical portion opposite said shoulder, and a finger spring having an annular intermediate portion, flexible means extending generally radially inwardly and away from one end of said intermediate portion and a plurality of long fingers extending outwardly from the other end of said annular intermediate portion, said long fingers having a length substantially greater than the axial length of said annular intermediate portion, said bracket being gripped between the ends of said long fingers and said shoulder with the said annular intermediate portion closely fitting said cylindrical portion and said means extending into said reduced diameter portion.

References Cited in the file of this patent

UNITED STATES PATENTS

| | | |
|---|---|---|
| 1,215,595 | Weikert | Feb. 13, 1917 |
| 1,788,612 | Benson | Jan. 13, 1931 |
| 1,927,615 | Ponti et al. | Sept. 19, 1933 |
| 2,496,938 | Friedman | Feb. 7, 1950 |
| 2,744,769 | Roeder et al. | May 8, 1956 |
| 2,869,905 | Bratz | Jan. 20, 1959 |

FOREIGN PATENTS

| | | |
|---|---|---|
| 468,097 | Canada | Sept. 12, 1950 |